US008577038B2

(12) United States Patent
Kameda et al.

(10) Patent No.: US 8,577,038 B2
(45) Date of Patent: Nov. 5, 2013

(54) METHOD AND DEVICE FOR GENERATING PSEUDORANDOM NUMBER, AND METHOD AND DEVICE FOR ENCRYPTION USING PSEUDORANDOM NUMBER

(76) Inventors: Osamu Kameda, Tokyo (JP); Masakazu Sato, Tokyo (JP)

( * ) Notice: Subject to any disclaimer, the term of this patent is extended or adjusted under 35 U.S.C. 154(b) by 459 days.

(21) Appl. No.: 12/670,299

(22) PCT Filed: Jul. 16, 2008

(86) PCT No.: PCT/JP2008/063227
§ 371 (c)(1),
(2), (4) Date: Aug. 2, 2010

(87) PCT Pub. No.: WO2009/014157
PCT Pub. Date: Jan. 29, 2009

(65) Prior Publication Data
US 2010/0284533 A1    Nov. 11, 2010

(30) Foreign Application Priority Data
Jul. 23, 2007   (JP) ................. 2007-190585

(51) Int. Cl.
| H04L 9/22 | (2006.01) |
| H04L 9/06 | (2006.01) |
| H04K 1/00 | (2006.01) |
| G06F 7/58 | (2006.01) |
| G06F 12/14 | (2006.01) |
| G06F 1/02 | (2006.01) |
| G10L 19/18 | (2013.01) |
| G06F 21/00 | (2013.01) |
| G06F 7/00 | (2006.01) |
| H04L 9/08 | (2006.01) |
| H04L 9/18 | (2006.01) |

(52) U.S. Cl.
USPC ............... 380/268; 380/28; 380/49; 704/201; 364/717; 713/189; 708/250

(58) Field of Classification Search
USPC ............... 380/268, 28, 49; 713/189; 704/201; 364/717
See application file for complete search history.

(56) References Cited

U.S. PATENT DOCUMENTS 5,258,936 A * 11/1993 Gallup et al. ................. 708/254
5,361,323 A * 11/1994 Murata et al. ................. 704/201

(Continued)

FOREIGN PATENT DOCUMENTS

| JP | H09-83512 A | 3/1997 |
| JP | H10-22994 A | 1/1998 |

(Continued)

OTHER PUBLICATIONS

Leo Dorrendorf, Zvi Gutterman, Benny Pinkas; "Cryptanalysis of the random number generator of the Windows operating system"; Oct. 2009; Transactions on Information and System Security (TISSEC), vol. 13 Issue 1; Publisher: ACM; pp. 1-32.*

(Continued)

*Primary Examiner* — Nirav B Patel
*Assistant Examiner* — Courtney Fields
(74) *Attorney, Agent, or Firm* — Studebaker & Brackett PC

(57) ABSTRACT

Provided are a method and apparatus for generating a pseudo-random number which is unpredictable and which has a small memory work area, and also a method and apparatus for encrypting data, for each predetermined amount, based on the generated pseudo-random number. A seed is divided into a predetermined number of blocks, new blocks are created by calculating an exclusive-OR of the blocks being different from each other, and the new blocks are merged to generate a new pseudo-random number. The data is encrypted for each determined amount based on the generated pseudo-random number. At this time, a pseudo-random number to be used for the succeeding encryption is generated by using as a seed a predetermined amount of random number of the pseudo-random number used for the preceding encryption of the predetermined amount of data.

9 Claims, 6 Drawing Sheets

(56) References Cited

U.S. PATENT DOCUMENTS

| | | | |
|---|---|---|---|
| 5,754,658 A | * | 5/1998 | Aucsmith .................. 380/28 |
| 2007/0106908 A1 | * | 5/2007 | Miyazaki et al. ........... 713/189 |

FOREIGN PATENT DOCUMENTS

| | | | |
|---|---|---|---|
| JP | H11-17673 A | | 1/1999 |
| JP | 2003-508975 A | | 3/2003 |
| JP | 2006-005803 A | | 1/2006 |
| WO | WO 0156222 A1 | * | 8/2001 |

OTHER PUBLICATIONS

Makoto Matsumoto et al.; "Mersenne Twister: A 623-Dimensionally Equidistributed Uniform Peseudorandom Number Generator"; ACM Transactions on Modeling and Computer Simulations: Special Issue on Uniform Random Number Generation; vol. 8, No. 1; Jan. 1998; pp. 3-30.

International Preliminary Report on Patentability and Written Opinion of the International Searching Authority issued on Jan. 26, 2010; International Application No. PCT/JP2008/063227.

Dai Watanabe et al.; "Giji Ransu Seiseki MUGI no Kogata Model o Tsukatta Ikutsuka no jikken (Some experiments on the mini-model of the pseudorandom number generator MUGI)"; IEICE Technical Report, vol. 107, No. 44, May 18, 2007, p. 11-16; with abstract.

International Search Report dated Aug. 19, 2008; International Application No. PCT/JP2008/063227.

Dai Watanabe et al.; "Giji Ransu Seiseiki MUGI no Kogata Model o Tsukatta Ikutsuka no Jikken (Some experiments on the mini-model of pseudorandom number genarator MUGI)"; IEICE Technical Report, vol. 107, No. 44, May 18, 2007, p. 11-16.

Japanese Office Action "Notification of Reason for Refusal" issued on Feb. 5, 2013, which corresponds to Japanese Patent Application No. 2007-190585 and is related to U.S. Appl. No. 12/670,299 with translation.

* cited by examiner

| 0 | 255 | 256 | 511 | 512 | 767 | 768 | 1023 |

A Block     B Block     C Block     D Block

| A xor B | B xor C | C xor D | A xor D | B xor D | A xor C |

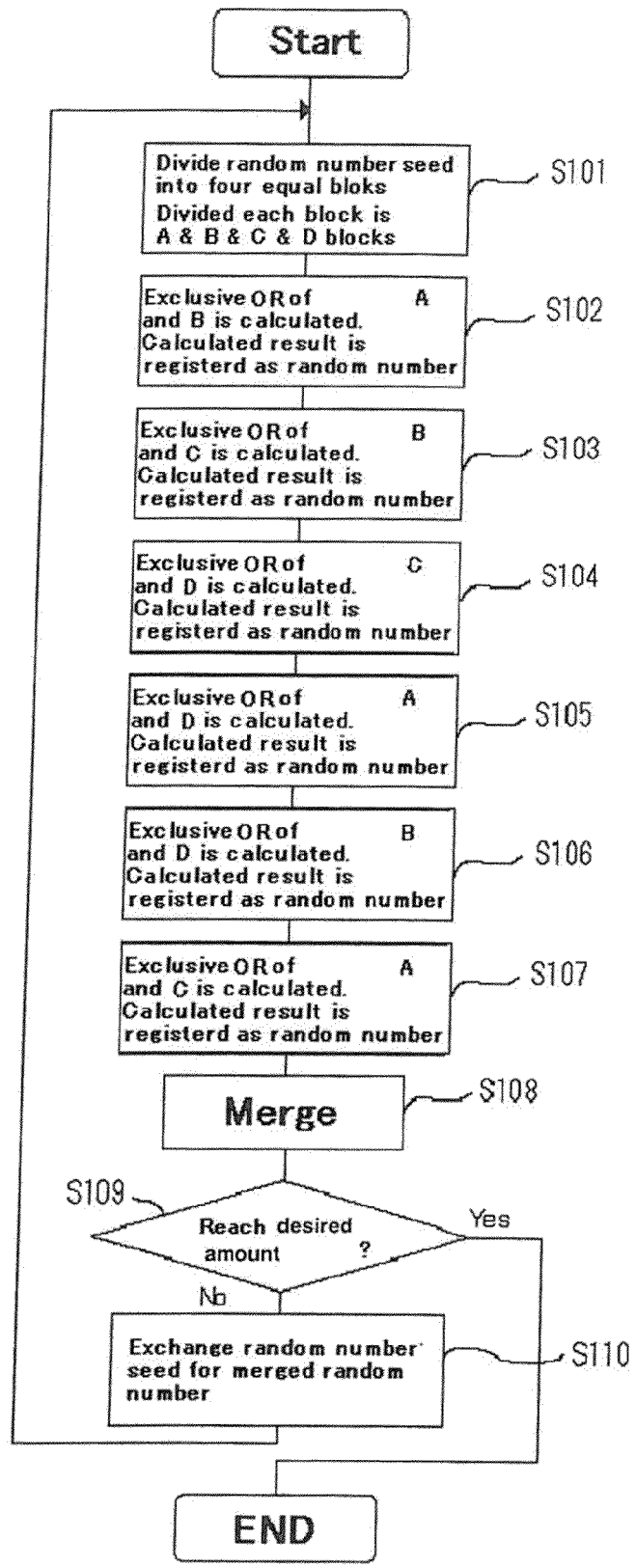

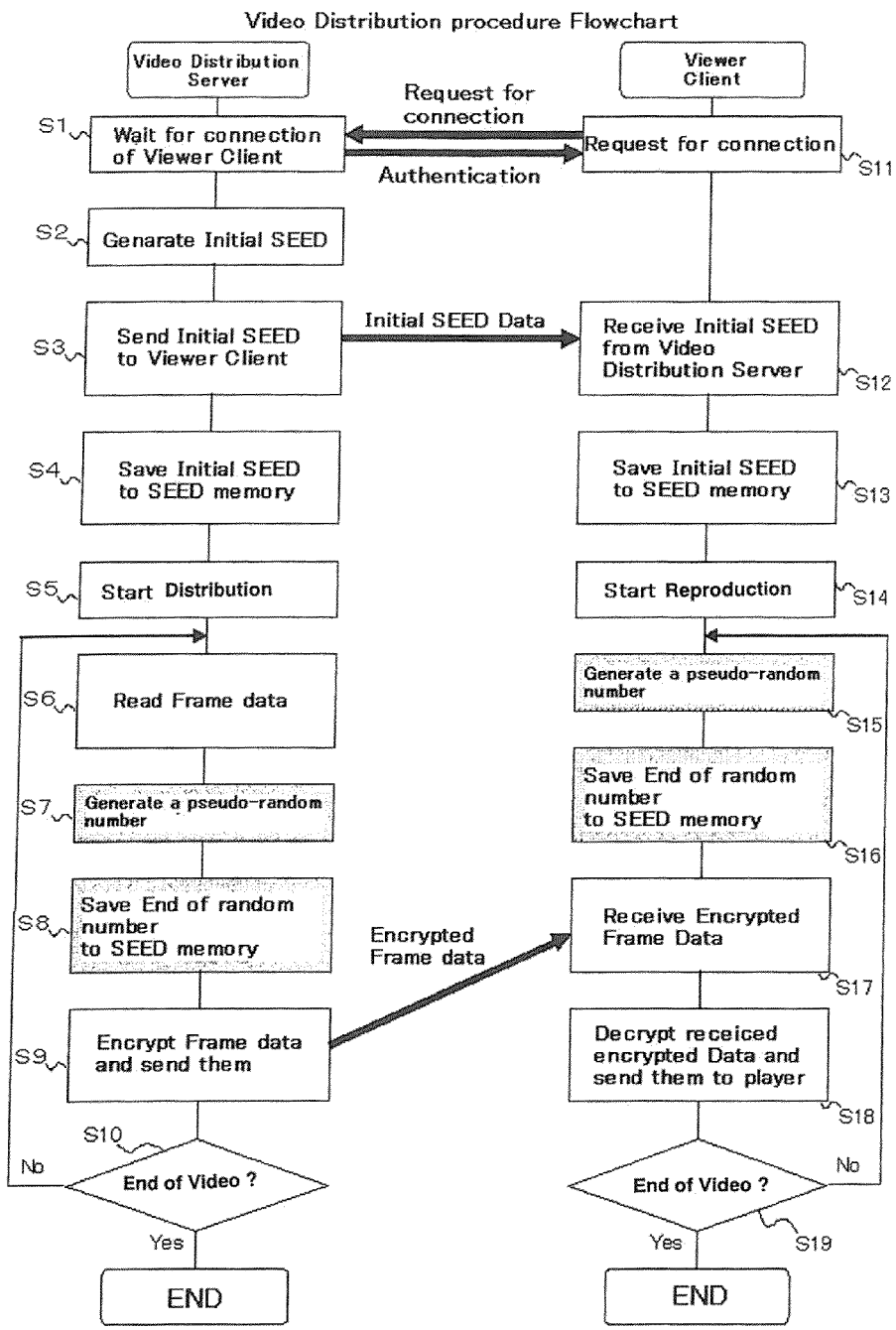

METHOD AND DEVICE FOR GENERATING PSEUDORANDOM NUMBER, AND METHOD AND DEVICE FOR ENCRYPTION USING PSEUDORANDOM NUMBER

TECHNICAL FIELD

The present invention relates to method and apparatus for generating a pseudo-random number which is unpredictable and which has a small working memory, and also to method and apparatus for encrypting data such as a message, a voice, an image or a moving image, for each predetermined amount, based on the generated pseudo-random number.

BACKGROUND ART

As conventional methods for generating the pseudo-random number, which are used to encrypt digital data and so on, the following methods have been known.

(1) Linear Congruential Method

By solving the following linear recurrence relation, a random number X' is obtained. This X' is used as X at a next operation. Then, such operation is repeated to generate random numbers. In the relation, each of A, B and M is a constant, and X is an initial value (SEED) of the random number.

$(A \times X + B) \bmod M = X'$ ("mod" is an operator to obtain a remainder)

(2) Mixed Congruential Method

By employing the following formula with appropriate parameters A, P and Q, a random number A' is obtained. This A' is used as A at a next operation. Then, such operation is repeated to generate random numbers. Each of A, P and Q is arbitrary only if it has a necessary number of digits.

$A \times P + Q = A'$ (3) Middle Square Method

A parameter A appropriately selected as an initial value (SEED) is squared, and a necessary number of digits are taken out from generally middle parts of the resulting value as a random number and then also squared. Such operation is repeated.

(4) Mersenne Twister Method

Mersenne Twister Method is one of pseudo-random number generators developed by Makoto Matsumoto and Takuji Nishimura. (Refer to the document authored by M. Matsumoto and T. Nishimura, "Mersenne Twister: A 623-dimensionally equidistributed uniform pseudo-random number generator", ACM Trans. on Modeling and Computer Simulation Vol. 8, No. 1, January pp. 3-30, 1998).

The obtained random number sequence has a very long period of $2^{19937}-1$, so that as compared to the above-mentioned methods (1) to (3), it has more reliable and equal randomness.

In a case of encrypting data (a plain text) such as a message, a voice, an image or a moving image using a pseudo-random number, in a conventional method, a random number of which a amount is equal to or greater than that of the plain text was generated and then the plain text data was encrypted based on the generated random number.

However, this method has a limitation that it can be applied to only case where the amount of the target plain text to be encrypted is fixed and encrypting or decrypting can be done collectively. Because, for executing the above processing, there should be prepared a memory having an area for managing a target plain text to be encrypted, a pseudo-random number of which an amount is the same as that of the target plain text and an encrypted result, so that a required total memory capacity increases in proportion to the amount of the target plaintext. On the other hand, the memory has a maximum memory capacity secured according to an operating environment, so that in case the amount of the plain text exceeds a determined value, the processing cannot be done.

For example, in a case Linux is employed as an OS of 32 bits, memory area secured in a lump in an application process unit working on Linux is about 1 GB, so that if encrypting is processed within the area, a limit of the encrypting of the plaintext becomes about 500 MB at most. Actually, a processable amount of the plain text will be further limited because a further memory area should be secured for other processing.

As an OS consisted of 64 bits spreads widely in future, this situation may change. But, since there is a limit to the capacity of an installed physical memory, it will be unchanged that any kind of improvement technology is necessary.

For reason of the limitation based such operational environment, when the amount of the plain target text to be encrypted is not fixed or the amount is extremely large, for example, in a case of moving image data, the conventional lump encrypting is not effective. Further, regarding the moving image data, even though the compression technology is heightened, the resolution is higher and higher and thus the data capacity is increasing. Still more, in a case of delivering moving image data in the Internet in real time, such as a live relay broadcast, since the delivery of the moving image data and storage of the moving image data to a file are done approximately at the same time, a total data capacity cannot be fixed until the last end of the live relay broadcast, so that the conventional lump encrypting is difficult.

On the other hand, there is a strong request for delivery of such moving image data in encrypted format so as to inhibit the seeing and hearing except the contractant. Nevertheless, because of the above-mentioned limit of the memory capacity, it is hard to respond to such request by the method of the conventional lump encrypting.

Thus, an encryption method using a pseudo-random number for each frame as a unit of communication even in a case of real-time delivery (for example, refer to Japanese Patent Application Laid-open No. 2003-508975).

DISCLOSURE OF THE INVENTION

The random numbers generated by the before-mentioned conventional pseudo-random number generating methods (1) to (3) are not suitable for encryption, because they have a periodicity being more or less changed according to employed parameters and thus values of successively generated random numbers are predictable. Further, the random number generated by Mersenne Twister Method of the before-mentioned method (4) is not suitable for encryption, either, because it is predictable owing to usage of the linear recurrence relation. Further, since a required working memory is large, the realization by hardware is difficult.

In addition, while the conventional encrypting method as before-mentioned does not need to consider a total data capacity, it is necessary to generate a different pseudo-random number for every frame so as to maintain security of the encryption. (If a pseudo-random number is generated from the same seed, its value is predictable and effectiveness of the encryption is lost accordingly.) Therefore, it is necessary to use seeds used for generating the pseudo-random number separately for each frame, so that there was caused a problem that a structure of the whole encrypting system is complicated.

The present invention has been developed in view of the above-stated conventional problems, and firstly provides a pseudo-random number generating method/apparatus comprising a step/means which divides a seed into a predetermined number of blocks, a step/means which creates a new block by calculating an exclusive-OR of the blocks being different from each other, and a step/means which generates a new random number by merging the new blocks.

Further, the present invention provides a pseudo-random number generating program to be executed by a computer, which comprises a procedure which divides a seed into a predetermined number of blocks, a procedure which creates a new block by calculating an exclusive-OR of the blocks being different from each other, and a procedure which generates a new random number by merging the new blocks.

Further, the present invention provides an apparatus/method which generates a pseudo-random number based on a seed and encrypts data such as a message, a voice, an image or a moving image (or video), for each predetermined amount of data, based on the generated pseudo-random number, wherein a pseudo-random number to be used for the succeeding encryption is generated by using as a seed a predetermined amount of random number of the pseudo-random number used for the preceding (or last) encryption of the predetermined amount of data.

Since the pseudo-random number generating method/apparatus according to the present invention divides a seed into a predetermined number of blocks, creates a new block by calculating an exclusive-OR of the blocks being different from each other, and generates a new random number by merging the new blocks, it can generate a random number that is unpredictable (or difficult in predictive possibility) with small working memory.

Further, since the encryption apparatus/method according to the present invention generates a pseudo-random number to be used for the succeeding encryption by using as a seed a predetermined amount of random number of the pseudo-random number used for the preceding (or last) encryption of the predetermined amount of data, it can relax the limit of the memory imposed to the operational environment for the encryption and also can maintain the security of the encryption by using a different seed for each encryption of the predetermined amount of data to generate different pseudo-random number sequences. Therefore, by performing such encryption process for each frame, for example, just before the delivery of the moving image data, the encryption is enabled in succession as needed, even though a total data capacity is not fixed.

BRIEF DESCRIPTION OF THE DRAWINGS

FIG. 2 is a flowchart illustrating pseudo-random number generating steps according to the present invention.

FIG. 7 is a flowchart illustrating operational steps of the delivery system as shown in FIG. 5.

BEST MODE FOR CARRYING OUT THE INVENTION

First, description is made of one embodiment of pseudo-random number generating method of the present invention. In this method, a pseudo-random number of a desired number of bytes is generated by extending a random number of a predetermined number of bytes. (An initial random number before the extension is called as a seed.) Concrete procedures for the method are described with reference to FIGS. 1A to 1C as hereinbelow.

First, a seed is divided into four partitions (see FIG. 1A) (in the present invention, the number of divisions is not limited in particular). For example, in a case of seed of 1024 bytes, the seed is divided into quarters, that is, four blocks each having 256 bytes. Hereinafter, these blocks are defined as A, B, C and D blocks sequentially from the top.

Figures 1A, 1B, 1C:
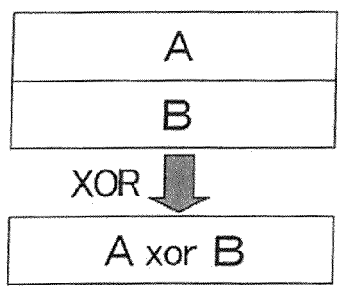
FIGS. 1A, 1B and 1C are explanatory diagrams illustrating a pseudo-random number generating method according to the present invention.

Next, by calculating an exclusive-OR (XOR) of the blocks (for example, A block and B block) to create a new block (A XOR B) as a result (see FIG. 1B).

Then, a predetermined function operation is executed on the blocks being different from each other such as A block and D block, B block and C block, and so on. Here, the exclusive-OR (XOR) is calculated. Thereby, a new block is obtained as an operation result for each calculation. In addition, since the above arithmetic expression provides a logical sum, the operation result also maintains the indeterminacy which A block and B block have.

Next, the blocks created as the results are merged. Since the number of combinations between the blocks as quarters is six, the blocks created newly become six blocks. By merging the new six blocks, an extension result is obtained for once. In an embodiment as illustrated, the extension result is 1.5 times as many as 1024 bytes of the original value by the calculation of 256×6=1,536 bytes.

Here, an amount of a pseudo-random number as the extension result is compared with a desired amount. If the comparison result is smaller than the desired amount, the above-mentioned steps, that is, the division of the block, the calculation of exclusive-OR of the blocks and the merge of the obtained results are repeated sequentially, using the pseudo-random number as the extension result as a new seed, until the desired amount or a amount near the desired one is obtained.

For example, so as to obtain 1 M bytes (1048576 bytes) of pseudo-random number from a seed of 1024 bytes, it is required to repeat this processing (the above-mentioned steps) 18 times. Accurately, the result of the 18$^{th}$ processing is 1,513,342 bytes. But, the last 484,766 bytes of the 1,048,576$^{th}$ bytes are discarded, and then the 1,048,576 bytes counted from the top is selected as the result.

FIG. 2 is a flow chart showing the above-mentioned steps. First, in step S101, a seed is divided into four blocks equally which are A, B, C and D blocks. Then, in steps S102-S107, the exclusive-OR calculations are executed on A and B blocks, on B and C blocks, on C and D blocks, on A and D blocks, on B and D blocks, and on A and C blocks, respectively, and the results thereof are recorded as random numbers. Subsequently, in step S108, thus obtained six random numbers are merged. Then, in step S109, whether or not the merged random number reaches a desired amount is judged. If it does not reach, the merged random number is substituted as a new seed (step S110) and the steps S101 to 5108 are repeated.

The pseudo-random number obtained through the above-mentioned steps has the following characteristics.

At first, regarding the random number quality, the pseudo-random number created through the extension also maintains the indeterminacy of n bits that the original seed has. In addition, even though based on the same seed, if the numbers of bytes to be extended are different, the content of the random number as finally generated is also different and thus unpredictable, so that the quality of the generated random number can withstand such application as encryption processing.

As for an aspect of the processing performance, since a simple processing by mainly calculating the exclusive-OR (XOR) is repeated, an processing speed is very high.

As to a practical use performance, installation of a hardware for a generating process is readily attained. That is, since a set of basic commands prepared in a general microcomputer chip are sufficient to work and there is no dependency upon commands equipped in only a specific microcomputer chip, a general-purpose hardware can be installed. Regarding a memory capacity necessary for working, it can be determined at a design stage in advance, because it is fixed as up to a double of an amount of a desired pseudo-random number.

Figure 3:
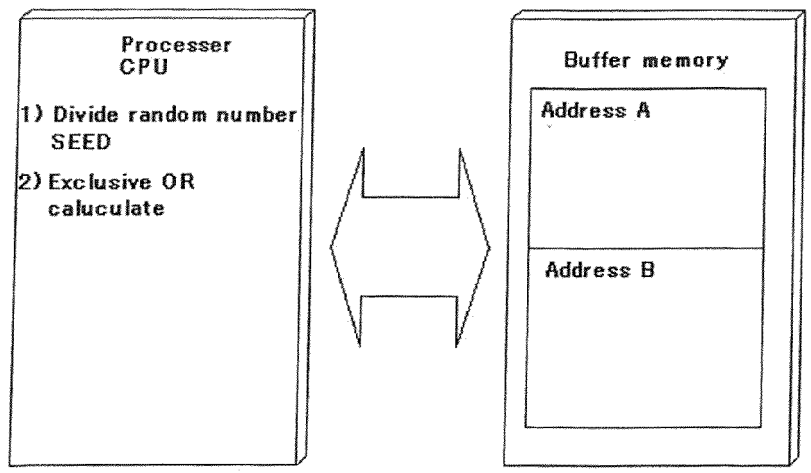
FIG. 3 is a block diagram illustrating an outline of a pseudo-random number generating apparatus according to the present invention.

FIG. 3 illustrates an outline of a pseudo-random number generating apparatus according to the present invention. This apparatus has at least a processor and a buffer memory to execute the before-mentioned steps. A buffer memory capacity equal to a double of a finally desired random number amount is reserved. An area of this buffer memory is divided into two equally. An address of one of divided buffer area is denoted as A, and that of the other divided buffer area is denoted as B.

At first, a seed is recorded in the buffer area indicated by the address A. The processor executes a first random number generation process according to the before-mentioned steps, and a random number obtained as a result is recorded in the buffer area indicated by the address B.

In the second et seq. random number generation processes, the address B and the address A are exchanged alternately to execute the processes, whereby the buffer area that was used for recording the seed in the previous generation process is used as an area for recording a random number generated in the present process, and the random number that was obtained in the previous generation process is handled as a seed in the present generation process. By repeating the process in this way, when the buffer that records the generated random numbers becomes full (that is, the random number having the desired amount has been obtained), the process is ended.

Next, an encryption apparatus/method according to the present invention is described hereinbelow.

Figure 4:
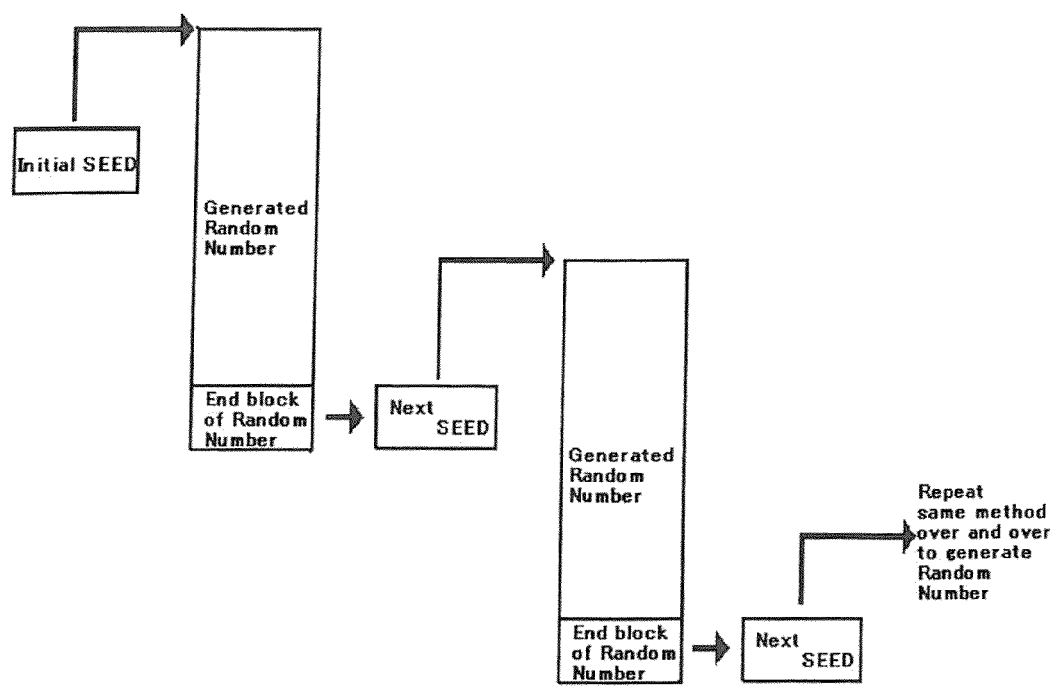
FIG. 4 is an explanatory diagram illustrating steps of generating pseudo-random numbers used for encryption of the present invention.

FIG. 4 is an explanatory diagram illustrating steps of generating a pseudo-random number used for the encryption apparatus/method of the present invention. The drawing shows steps from generation of the first pseudo-random number based on an initial seed to generation of the third pseudo-random number. Generations of the third et seq. pseudo-random numbers are performed by repeating the similar processes. In the drawing, arrows show that specific function operations are executed based on seeds.

In FIG. 4, an amount of a generated pseudo-random number is fixed in advance, a predetermined amount of random number is taken out from an end portion of the pseudo-random number, and the taken-out random number is used as a seed for a random number to be used for the succeeding encryption. That is, by repeating these steps, pseudo-random numbers being consecutive and new (but different from each other) can be created for each fixed amount.

By exchanging an initial seed and a generation capacity of a pseudo-random number for each generation between an encryption side and a decryption side, in advance, and executing the same steps between the encryption side and the decryption side, the both sides can generate the same pseudo-random numbers in succession and can maintain safety cryptography communication.

The pseudo-random numbers generated consecutively and for each determined amount through the above-mentioned steps can be used for e.g. the encryption of a moving image (or video) to be delivered. In other words, by performing an encryption process based on the pseudo-random number generated consecutively and for each determined amount, in frame units, just before the delivery of the moving image (or video), the consecutive encryptions are possible as needed even though the total data capacity is not decided. Since a side to decrypt the encrypted data has been informed of an initial seed and a function for a pseudo-random number, it can reproduce the pseudo-random numbers generated consecutively. Then, by repeating a decryption process in frame units using the pseudo-random numbers generated consecutively, the decryption side can decrypt the whole moving image data.

In addition, the encryption according to the present invention is applicable not only for the moving image data but also for such data as a message, a voice or a still image as a matter of course.

In the embodiment as illustrated in FIG. 4, a predetermined amount of random number taken out from an end portion of the pseudo-random number used for the preceding (or last) encryption of a predetermined amount of data is used as a seed to generate a pseudo-random number for the succeeding encryption. But, in the present invention, a predetermined amount of random number continued from an arbitrary position of the pseudo-random number used for the preceding (or last) encrypting of the predetermined amount of data may be used as a seed to generate a pseudo-random number to be used for the succeeding encryption.

Figure 5:
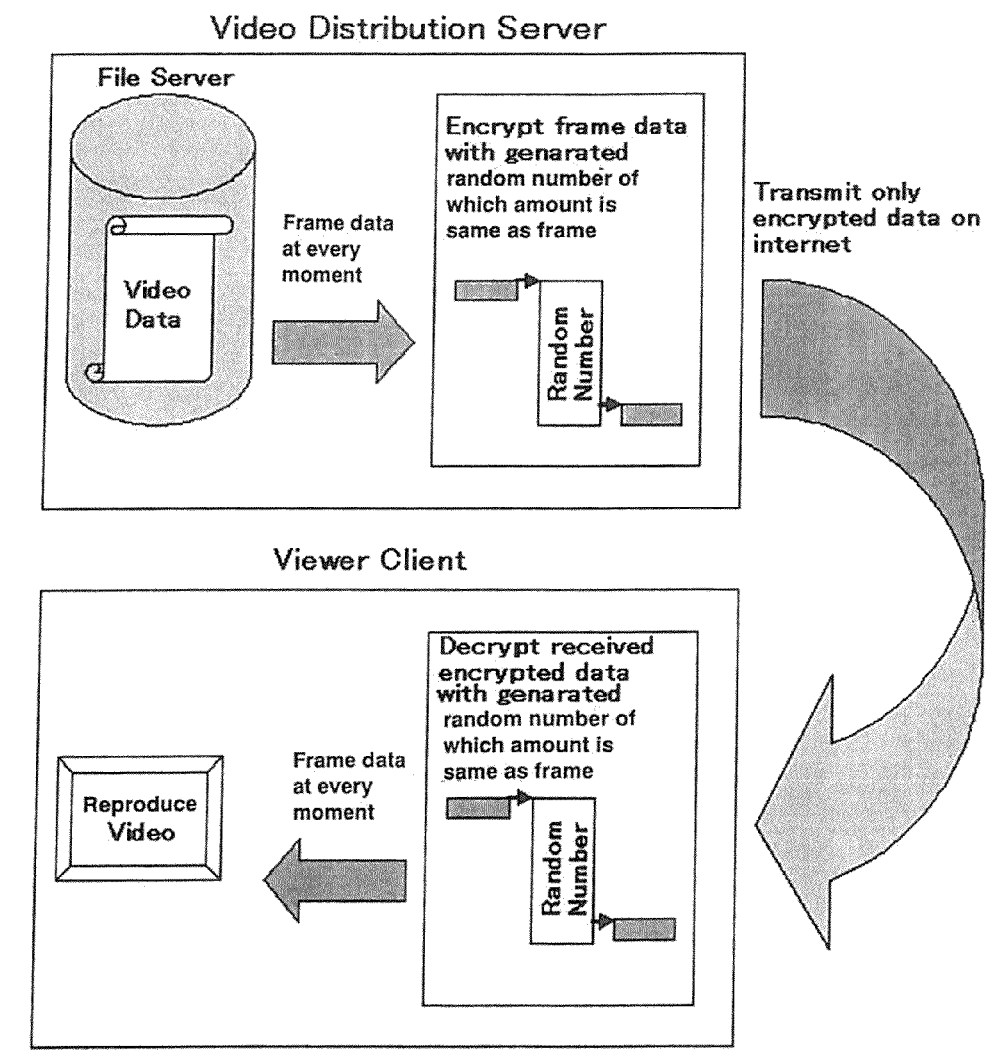
FIG. 5 shows one embodiment in which encryption according to the present invention is applied to a moving image delivery.

FIG. 5 shows an embodiment in which the encryption technology according to the present invention is applied to a moving image delivery system (video distribution system).

As a system which handles large-capacity data, it is currently known a delivery system of a moving image (or video) using the Internet or a cable TV. In such a system, a delivering service is provided for only viewers who are under contract, while the moving image data is encrypted so that a third party being not under contract cannot view contents of the data.

Regarding the moving image, its capacity tends to be large. Therefore, it is difficult to encrypt all the data in a lump before delivery thereof. In a case of real-time delivery which is promoted simultaneously with picking-up of an image, a capacity of the whole data is not decided until the delivery is completed. Therefore, lump encryption is impossible. Fortunately, in delivering the moving image (or video), the moving image is not collectively received but received for each image frame as compressed or in units of several frames, so that the moving image can be viewed if it is sequentially decrypted in the units.

In FIG. 5, in an moving image delivery side (video distribution server) which delivers the moving image (or video), frame data at every moment is taken out from a file server which accumulates therein the moving image data, and it is sent to an encryption apparatus. In the encryption apparatus, a pseudo-random number having the same amount as that of the frame data is generated according to the encrypting steps as shown in FIG. 1, and the encryption of the frame data is done based on the generated pseudo-random number. Then, the encrypted frame data is sent to a viewer side (viewer client) through the Internet, a CATV network or the like. (For simplification, in the drawing, transmitting/receiving facilities and input/output devices at the delivery and viewer sides are omitted.) In the viewer side, a pseudo-random number having the same amount as that of the frame data is generated, based on an initial seed and a generation capacity of a pseudo-random number for each generation, obtained by exchanging with the delivery side in advance, through the same steps as in the delivery side, and then the received encrypted frame data is decrypted based on the generated pseudo-random number. The above-mentioned steps are consecutively performed in units of a frame (or frames) of the moving image. The viewer can see and hear a reproduced moving image.

Figure 6:
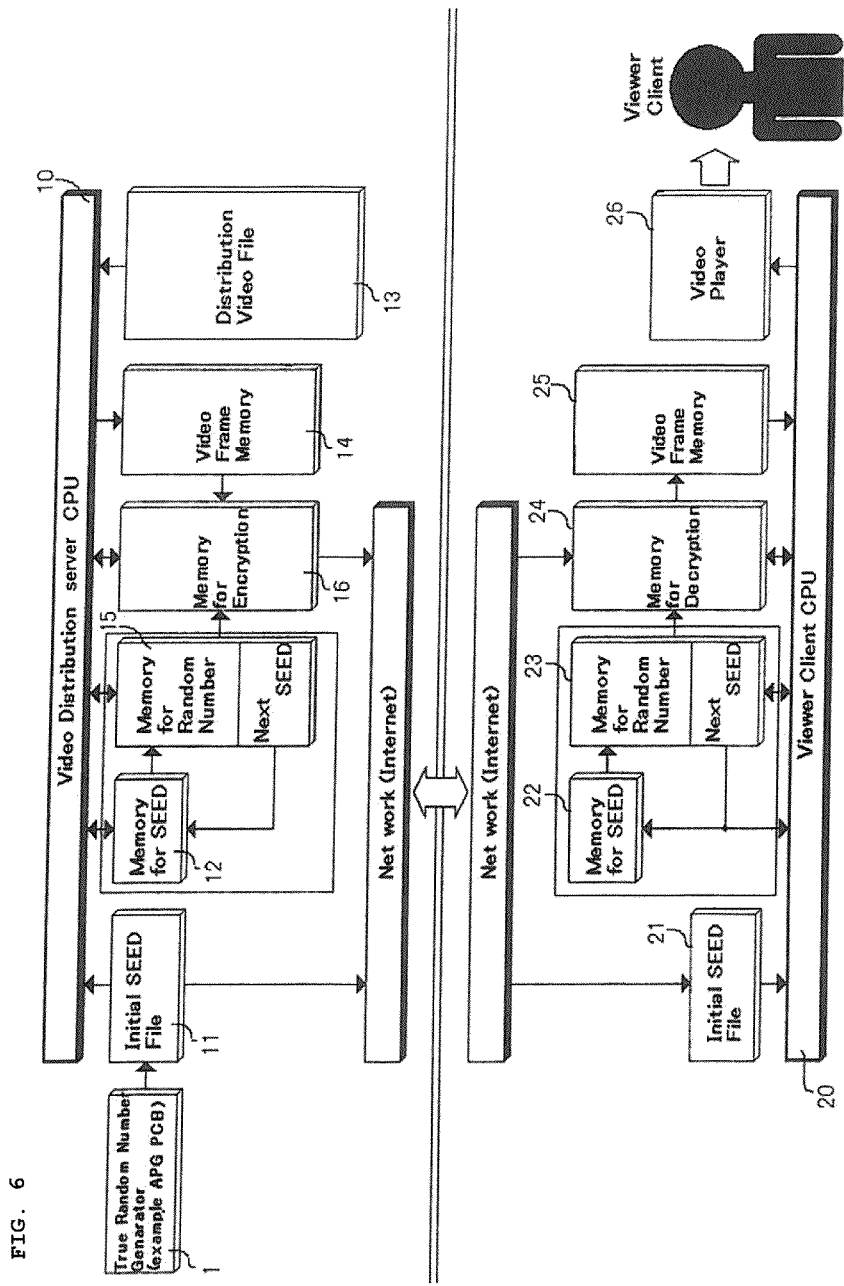
FIG. 6 is a block diagram illustrating a configuration of the delivery system as shown in FIG. 5.

FIG. 6 is a block diagram illustrating a configuration of the moving image delivery system (video distribution system) as shown in FIG. 5. FIG. 7 is a flowchart illustrating operation steps (procedures) of the delivery system (video distribution system). The following is a description of the delivery system of FIG. 5 based on the block diagram of FIG. 6 and the flowchart of FIG. 7. In addition, the following operations are performed according to a predetermined program under the controls by the CPU10 on the moving image delivery side (video distribution server) and by the CPU20 on the viewer side (viewer client).

At first, when the viewer side sends a connection request to the delivery side which delivers the moving image (or video) (Step S11), the delivery side certifies that the viewer side is a correct contractant (Step S1). When it is certified correctly, the delivery side takes out a random pulse from a true random number generator 1 (random pulse generator), generates an initial seed (Step S2) and sends the seed to the viewer side through a network (for example, a computer network like Internet) (Step S3). The generated initial seed is saved in an initial seed file 11. Then, the delivery side refers to the initial seed file 11, reads out data saved there, saves the data in a seed memory 12 (Step S4), and starts delivery of the moving image (or video) (Step S5). The viewer side receives the initial seed (Step S12), saves it to an initial seed file 21, refers to the file to read out data as saved, saves the data as read into a seed memory 22 (Step S13), and starts reproduction of the moving image (Step S14).

The delivery of the moving image (or video) is performed as follows. At first, the moving image data read out as frame data from a file server (delivering moving image file) 13 is read in an image frame memory 14 (Step S6). Based on the seed saved in the seed memory 12 (an initial seed in a case of the first encryption), a predetermined function operation is executed to generate a pseudo-random number (Step S7), and the generated pseudo-random number is saved in a pseudo-random number memory 15. At this time, a predetermined amount of end portion (or block) of the random number is saved in the seed memory as a seed for the succeeding encryption (Step S8). The frame data saved in the image frame memory is encrypted based on the pseudo-random number saved in the pseudo-random number memory, and then the encrypted frame data is saved in the encryption memory 16 and also sent to the viewer side (Step S9). The above steps are repeated till the end of the moving image data to be delivered (Step S10).

On the other hand, the reproduction of the moving image is performed as follows. At first, based on the seed saved in the seed memory 22 (an initial seed in a case of the first decryption), the same function operation as in the delivery side is executed to generate a pseudo-random number (Step S15), and the generated pseudo-random number is saved in a pseudo-random number memory 23. In this time, the predetermined amount of end portion of the random number is saved in a seed memory 22 as a seed for the succeeding decryption (Step S16). When the encrypted frame data is received from the delivery side (Step S17), the received frame data is saved in a decryption memory 24. Based on the pseudo-random numbers saved in the pseudo-random number memory, the frame data saved in the decryption memory is decrypted, and the decrypted frame data is saved in an image frame memory 25 and also sent to an image player 26 (reproducing mechanism) (Step S18). The above steps are repeated till the end of the moving image data to be decrypted (Step S19).

In addition, the above-mentioned embodiment has been explained, taking the delivery of a moving image (of vide) as an example. But, the present invention is applicable not only for the delivery of a moving image, but also delivery of a messaging, a voice, a still image or the like in the same way as a matter of course.

This application claims priority from Japanese Patent Application No. 2007-190585 filed on Jul. 23, 2007, disclosures of which are hereby incorporated by reference herein as a part of this application.

The invention claimed is:

1. A method for generating a pseudo-random number having a desired data amount that is used for encrypting digital data, said method comprising:
   storing a pseudo-random number as a seed in a memory device;
   dividing the seed stored in the memory device into a predetermined number of blocks;
   creating a plurality of blocks of new pseudo-random numbers by calculating exclusive-ORs on combinations of blocks being different from one another of the predetermined number of blocks, respectively, using a processor unit;
   generating a new pseudo-random number having a greater data amount as compared with the seed by merging a plurality of blocks of the new pseudo-random numbers; and
   comparing a data amount of the new pseudo-random number as generated with a desired data amount,
   wherein if the comparison result is less than the desired data amount, the seed stored in the memory device is replaced by the new pseudo-random number as generated, which is stored as a new seed in the memory device, and said dividing, creating, generating and comparing are repeated until a pseudo-random number having the desired amount is obtained.

2. A method according to claim 1, wherein if the comparison result is greater than the desired data amount, a required data amount of pseudo-random number is secured and the other is discarded.

3. An apparatus for generating a pseudo-random number having a desired data amount that is used for encrypting digital data, said apparatus comprising:
   a memory device which stores a pseudo-random number as a seed; and
   a processor unit configured to divide the seed stored in the memory device into a predetermined number of blocks, calculate exclusive-ORs on combinations of blocks being different from one another of the predetermined number of blocks, respectively, to create a plurality of blocks of new pseudo-random numbers, and merge a plurality of blocks of the new pseudo-random numbers to generate a new pseudo-random number having a greater data amount as compared with the seed,
   wherein the processor unit further configured to compare a data amount of the new pseudo-random number as generated with a desired data amount, and if the comparison result is less than the desired data amount, the seed stored in the memory device is replaced by the new pseudo-random number as generated, which is stored as a new seed in the memory device, and said dividing, creating, generating and comparing processes are repeated until a pseudo-random number having the desired amount is obtained.

4. An encrypting system including:
a pseudo-random number generating apparatus which generates a pseudo-random number based on a seed; and
an encrypting apparatus which encrypts data including a message, a voice, an image or a moving image, for each predetermined amount of data, based on the pseudo-random number generated by the pseudo-random number generating apparatus,
wherein the pseudo-random number generating apparatus comprises a memory device which stores a pseudo-random number as a seed, and a processor unit configured to divide the seed stored in the memory device into a predetermined number of blocks, calculate exclusive-ORs on combinations of blocks being different from one another of the predetermined number of blocks, respectively, to create a plurality of blocks of new pseudo-random numbers, and merge a plurality of blocks of the new pseudo-random numbers to generate a new pseudo-random number having a greater data amount as compared with the seed, and
wherein said pseudo-random number generating apparatus further generates a pseudo-random number to be used for the succeeding encryption by using as a seed a predetermined amount of random number of the pseudo-random number used for the immediately preceding encryption of the predetermined amount of data.

5. A system according to claim 4, wherein a predetermined amount of random number continued from an arbitrary position of the pseudo-random number used for the immediately preceding encryption of the predetermined amount of data is used as a new seed to generate a pseudo-random number to be used for the succeeding encryption.

6. A system according to claim 5, wherein a predetermined amount of random number taken out from an end portion of the pseudo-random number used for the immediately preceding encryption of the predetermined amount of data is used as a new seed to generate a pseudo-random number to be used for the succeeding encryption.

7. An encrypting method including:
storing a pseudo-random number as a seed in a memory device;
dividing the seed stored in the memory device into a predetermined number of blocks;
creating a plurality of blocks of new pseudo-random numbers by calculating exclusive-ORs on combination of blocks being different from one another of the predetermined number of blocks, respectively, using a processor unit;
generating a new pseudo-random number having a greater data amount as compared with the seed by merging the plurality of blocks of new pseudo-random numbers; and
encrypting data including a message, a voice, an image or a moving image, for each predetermined amount of data, based on a pseudo-random number obtained from the generated new pseudo-random number,
wherein a pseudo-random number to be used for the succeeding encryption is generated by using as a new seed a predetermined amount of random number of the pseudo-random number used for the immediately preceding encryption of the predetermined amount of data.

8. An encrypting method according to claim 7, wherein a predetermined amount of random number continued from an arbitrary position of the pseudo-random number used for the immediately preceding encryption of the predetermined amount of data is used as a new seed to generate a pseudo-random number to be used for the succeeding encryption.

9. An encrypting method according to claim 7, wherein a predetermined amount of random number taken out from an end portion of the pseudo-random number used for the immediately preceding encryption of the predetermined amount of data is used as a new seed to generate a pseudo-random number to be used for the succeeding encryption.

* * * * *